(12) United States Patent
Akiyama

(10) Patent No.: US 6,907,026 B2
(45) Date of Patent: Jun. 14, 2005

(54) RECEIVING APPARATUS FOR SIGNAL TRANSMISSION SYSTEM OF ORTHOGONAL FREQUENCY DIVISION MULTIPLEXING TYPE

(75) Inventor: Toshiyuki Akiyama, Tokorozawa (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 901 days.

(21) Appl. No.: 09/887,067

(22) Filed: Jun. 25, 2001

(65) Prior Publication Data

US 2001/0055296 A1 Dec. 27, 2001

(30) Foreign Application Priority Data

Jun. 27, 2000 (JP) ........................................ 2000-192323

(51) Int. Cl.[7] .................................................. H04J 1/00
(52) U.S. Cl. ....................... 370/344; 370/203; 370/208; 375/260
(58) Field of Search ................................ 370/203, 208, 370/344; 375/260

(56) References Cited

U.S. PATENT DOCUMENTS

| | | | | |
|---|---|---|---|---|
| 5,867,478 A | * | 2/1999 | Baum et al. | 370/203 |
| 6,091,702 A | * | 7/2000 | Saiki | 370/203 |
| 6,449,245 B1 | * | 9/2002 | Ikeda et al. | 370/208 |
| 6,515,960 B1 | * | 2/2003 | Usui et al. | 370/203 |
| 6,545,997 B1 | * | 4/2003 | Bohnke et al. | 370/347 |
| 6,567,374 B1 | * | 5/2003 | Bohnke et al. | 370/203 |
| 6,606,296 B1 | * | 8/2003 | Kokkonen | 370/203 |
| 6,678,337 B1 | | 1/2004 | Sugita | |
| 6,768,713 B1 | * | 7/2004 | Siala et al. | 370/203 |
| 2001/0015954 A1 | * | 8/2001 | Kuwabara et al. | 370/206 |

FOREIGN PATENT DOCUMENTS

| | | |
|---|---|---|
| JP | 1075226 | 3/1998 |
| JP | 10164162 | 6/1998 |
| JP | 11163822 | 6/1999 |
| JP | 11239115 | 8/1999 |
| JP | 200059269 | 2/2000 |

* cited by examiner

Primary Examiner—Kenneth Vanderpuye
Assistant Examiner—Zewdu Habte
(74) Attorney, Agent, or Firm—Mattingly, Stanger, Malur & Brundidge, P.C.

(57) ABSTRACT

A signal transmission system of an OFDM using a plurality of carriers to transmit signal comprises a transmitting apparatus and a receiving apparatus. The receiving apparatus comprises an input unit for applying the OFDM signal from the transmitting apparatus; a fast Fourier transforming unit for separating the OFDM signal from the input unit into base-band signals including pilot signals; an interpolation unit for interpolating the pilot signals in a time-axis direction and a frequency-axis direction to calculate reference signal vectors of the carriers in which the pilot signals are not included; a demodulation unit for decoding to be produced as information codes; a delay a unit for adjusting a delay time of said base-band signals passing the delay unit; and a control unit coupled with the interpolation unit, for changing frequency band characteristics of the interpolation unit.

16 Claims, 9 Drawing Sheets

RECEIVING APPARATUS FOR SIGNAL TRANSMISSION SYSTEM OF ORTHOGONAL FREQUENCY DIVISION MULTIPLEXING TYPE

BACKGROUND OF THE INVENTION

The present invention relates to a signal transmission system and a receiving apparatus each using an orthogonal frequency division multiplexing (hereinafter abbreviated as OFDM) scheme for transmitting information codes by means of a plurality of carriers orthogonal to one another and more particularly to a receiving apparatus for the signal transmission apparatus of the OFDM scheme in which the plurality of carries of the OFDM scheme are modulated in accordance with a modulation scheme accommodated to the synchronization detection (hereinafter referred to as synchronous modulation scheme).

In recent years, in the field of radio devices, the OFDM scheme is in the limelight as a modulation scheme immune to multipath fading. A large number of applied studies on the OFDM are now in progress in the fields of next-generation television broadcasting, FPU (Field Pick-up Unit), radio LAN and so on in many countries including European countries and Japan. The trend of development and the system for terrestrial-wave digital broadcasting of the UHF band are disclosed in "THE JOURNAL OF THE INSTITUTE OF IMAGE INFORMATION AND TELEVISION ENGINEERS", 1998, Vol. 52, No. 11, pp. 1539–1545 and pp. 1658–1665.

As an example of the prior art, the UHF-band terrestrial-wave digital broadcasting system in Japan will be described below. It should be noted however that this system involves an extremely complicated configuration, so that the following description will be made on the system which is simplified to such an extent that is required for understanding the present invention.

Beginning with description on the structure of a carrier in this broadcasting system, as illustrated in FIG. 7, one signal transmission frequency band is divided into 13 segments, and a total of approximately 1,400 carriers are used in the transmission.

Information codes of up to three channels (three layers) can be simultaneously transmitted as a signal to be transmitted. The number of segments and a modulation method used in each layer can be freely selected as mentioned in the above document.

As modulation schemes, there are two kinds of modulation schemes using synchronous detection (synchronous modulation scheme) and using differential detection (differential modulation scheme).

Since the present invention concerns the transmission apparatus using the synchronous modulation scheme, a 64 quadrature amplitude modulation (64QAM) scheme, for example, is used as the synchronous modulation scheme and a structure of a carrier portion for modulating all segments in accordance with the 64QAM scheme will be described in detail.

FIG. 8 is a diagram for explaining in greater detail the structure of the carriers of segments which are modulated in accordance with the synchronous modulation scheme. The diagram of FIG. 8 shows only left side (lower frequency region) of the band W shown in FIG. 7.

In a mode which uses all segments for transmission of information codes on one layer, it may be through that a similar structure is repeated over the entire band.

In FIG. 8, the horizontal direction represents the frequency and the vertical direction represents the lapse of time, and squares "□" arranged in the horizontal and vertical directions each represent one carrier. Thus, one row of squares "□" arranged in the horizontal direction within the band W represents one symbol which forms an OFDM signal.

The square "□" with "SP" inscribed therein represents the carrier position of a pilot signal which is used for reproducing a reference signal (utilized as the basis for phase and amplitude) during demodulation. Further, the square "□" without any inscription therein represents the carrier position of an information code modulated in accordance with the 64QAM scheme.

The pilot signals are scattered both in the frequency direction and the time direction and accordingly they are designated as SP (Scattered Pilot).

FIG. 8 merely schematically illustrates the arrangement of the SP, and a TMCC (Transmission and Multiplexing Configuration Control) carrier for transmission of a control signal and additional information AC (Auxiliary Channel) to be arranged originally in FIG. 8 are omitted.

Further, in the terrestrial-wave digital broadcasting system, the interval in the horizontal direction of the carriers having the SP in the time direction is three, whereas the interval is changed to five in FIG. 8. This change is made for easy understanding of the present invention described later and essential contents are identical.

A signal modulated with the 64QAM scheme is represented by any position of 64 signal points indicated by broken line circles on a complex plane defined with I-axis (real axis) and Q-axis (imaginary axis) orthogonal with each other as shown in FIG. 9 and the respective signal points are corresponded to 6-bit codes which are different from one another. For example, the signal point b on the I-Q complex plane in FIG. 9 is corresponded to a code "011111".

The modulation processing in accordance with the 64QAM scheme involves dividing a sequence of input information codes in units of six bits, each divided 6-bit code is assigned to one of the 64 signal points on the I-Q complex plane, for example, a signal point indicated by a solid line circle "○". Each of 6-bit codes is converted into a signal corresponding to coordinate value of the assigned signal point.

On the other hand, a received modulated signal is affected by noise and other influences during a transmission process and distorted. For example, a signal point upon transmission indicated by a solid line circle "○" in FIG. 9 is moved from a position b to a position b' indicated by a cross "×" when received.

The demodulation processing in accordance with the 64QAM scheme involves selecting the signal point b closest to the signal point b' for the received signal indicated by cross "×", from 64QAM signal points indicated by broken line circles in FIG. 9, and outputting a 6-bit code corresponding to the selected signal point.

For the demodulation processing, the correct signal point position indicated by the broken line circle associated with the received signal must be detected. The reproduction of the position only requires to find, for example, the direction and magnitude of a reference signal vector representing a correct position of a reference coordinate point a on the signal space in FIG. 9.

The direction and magnitude of the reference signal vector of a received signal are affected by multipath and the like, which may occur on a transmission path, causing the phase to rotate and the amplitude to change as well, as shown in FIG. 10. It is necessary to reproduce the reference signal vector on basis of the pilot signal for each carrier on the reception side. The reference signal vector is produced for a carrier containing no pilot signal on the basis of the pilot signal contained in a nearby carrier.

As described above, the phase and magnitude of the reference signal vector change every time or from one carrier to another, while the manner of changing is generally expressed by a smooth curve and has a strong correlation in the time direction and in the carrier direction. Accordingly, the reference signal vector for a modulated signal A of an arbitrary carrier of an arbitrary symbol in FIG. 8 can be calculated by interpolation of a plurality of sporadically transmitted SP signals. In FIG. 8, the SP signals are arranged so that the interpolation can be made efficiently.

The terrestrial-wave digital broadcasting system has no regulation to the method of reproducing the reference signal vector from a signal having the carrier structure of FIG. 8. However, it can be realized by the circuit shown in FIG. 11, for example. FIG. 11 shows a circuit portion used to reproduce the reference signal vector in a receiving apparatus of the OFDM scheme.

A received signal produced from a fast Fourier transform (FFT) circuit 5 is supplied to a time-direction interpolation circuit 6 and a delay circuit 7. The time-direction interpolation circuit 6 extracts the pilot signals SP from the received signal. The pilot signals SP are subjected to filtering processing in a digital LPF having a predetermined number of taps for each carrier row containing the pilot signals in the time direction as shown by hatching of FIG. 12 and outputted as reference signal vector signals interpolated in the time direction. The digital LPF is not shown in FIG. 11, while it is included in the time-direction interpolation circuit 6. Each tap coefficient of the digital LPF is stored in a coefficient memory (not shown) in the time-direction interpolation circuit 6. The carrier in which the SP signal is arranged is hereinafter referred to SP carrier.

FIG. 13 schematically illustrates the interpolation method of determining reference signal vectors of carriers having no SP by means of the interpolation in the time direction for carriers existing on a single-dotted broken line 3 of FIG. 8. The horizontal axis represents time and the scale on the horizontal axis is represented for each symbol. The vertical lines having mark ○ at the top thereof represent signal vectors of the received SP signals.

The reference signal vectors of carriers received from the time that a certain SP, for example, SP1 is received to the time that next SP2 is received are calculated by interpolation by means of an LPF having a fixed number of taps by using signal vectors of a plurality of SPs positioned before and after the carriers.

All of reference signal vectors of the carrier row in the time direction hatched in FIG. 12 can be calculated by the interpolation of the SPs in the time direction. At this time, the interpolation in the LPF requires signals having the symbols equal in number to the taps and the interpolated signals are delayed by the number of symbols equal to about half of the number of taps to be outputted.

A delay circuit 7 is provided to match the timing of the received signal to the timing of the interpolated signals.

On the other hand, the reference signal vector for a modulated signal A in the carrier in which SP is not arranged in FIG. 8 is calculated by interpolation in the frequency direction of the reference signal vectors of SPs arranged in the time axis direction and SPs calculated by interpolation of thereof. A frequency-direction interpolation circuit 8 of FIG. 11 is a circuit for carrying out the interpolation.

FIG. 14 schematically illustrates the interpolation method of the SPs in the frequency direction for the symbol on a single-dotted broken line 4 of FIG. 12. The horizontal axis represents frequency and the scale on the horizontal axis is represented for each carrier position. Thick arrows represent the reference signal vectors W(1), W(5+1), W(2×5+1), . . . for the carriers hatched in FIG. 12 and calculated by interpolation in the time axis direction. The numerals within parentheses are carrier numbers.

The reference signal vectors at the carrier positions A having no thick arrow are calculated as follows. First of all, signals W(1), 0, . . . , 0, W(5+1), 0, . . . , 0, W(2×5+1), . . . . obtained by setting the magnitudes of vectors of the carriers having no thick arrow in FIG. 14 to 0 are caused to pass through a usual digital LPF (not shown) having 23 taps, for example, so that the smooth interpolated signals expressed by a broken line are calculated. The interpolated signals thus calculated are outputted as the reference signal vectors of the modulated signal A. The digital LPF is provided within the interpolation circuit 8.

The reference signal vector signals reproduced by the frequency-direction interpolation circuit 8 and the received signal delayed by the number of symbols equal to about half of the number of taps in the delay circuit 7 are supplied to the 64QAM demodulation circuit 9 to correct the phase and amplitude of each signal point of the received signal, so that the signal point position deformed as shown in FIG. 10 can be corrected to the correct position as shown in FIG. 9 to thereby demodulate information codes.

SUMMARY OF THE INVENTION

When the OFDM signal is transmitted by radio wave from a vehicle or the like moving at a high speed, rotation vibration occurs in the phase angle of the SP carriers arranged in the time direction on the reception side due to Doppler fading. The rotation frequency is increased as the relative moving speed between the transmission side and the reception side is increased.

For example, when a radio transmission apparatus using the 7 GHz band receives the OFDM signal while moving at a speed of 25 km per hour, a Doppler frequency of about 160 Hz at the maximum is produced. Consequently, the phase angle of the SP carrier also begins to rotate at the same frequency of about 160 Hz at the maximum. When the moving speed is increased, the Doppler frequency and the frequency of the phase rotation of the SP carrier are also increased in proportion to the increase of the moving speed.

The OFDM scheme is paid attention as a system immune to the multipath fading or the Doppler fading. Thus, in order to increase the robustness of high-speed mobile radio transmission against the Doppler fading, it is necessary to control a pass bandwidth of a digital low-pass filter (LPF) of the time-direction interpolation circuit used in the interpolation in the time direction in accordance with the moving speed. It is generally preferably to set the pass bandwidth to the Nyquist limit frequency of a sampling frequency determined by the frequency that the SP carriers are inserted in the time direction or a frequency slightly lower than it.

For example, when the symbol frequency is set to about 19 kHz and the SP carriers are inserted at intervals of 4 symbols in FIG. 8, the Nyquist frequency is determined from $(19 \text{ kHz}/4) \times \frac{1}{2} = 19 \text{ kHz}/8 \approx 2 \text{ kHz}$. Accordingly, the pass bandwidth of the LPF of the time-direction interpolation circuit is set to about 2 kHz. Even in this case, a limit of the Doppler frequency that it can cope with is one a few number-th of the pass bandwidth, for example 2 kHz/8=250 Hz actually from the condition for an amount of distortion allowed to the interpolated signal.

On the other hand, a transmission apparatus of the OFDM scheme is not always mounted in a moving vehicle to be used. The transmission apparatus is sometimes used fixedly after arrival of a destination or it is sometimes used while moving at a low speed. In such cases, it is sometimes required that information codes having low error rate of code and good quality are transmitted as far as possible.

Accordingly, since the transmission apparatus suitable for the high-speed mobile radio transmission and the transmission apparatus suitable for transmission to the distance have different respective characteristics of the LPFs to be required, there are problems that it is necessary to provide two kinds of transmission apparatuses having different characteristics and the operating rate of each transmission apparatus is reduced to be ineffective.

Further, in a transmission field or site, when it is required to change a transmission form suddenly, for example, when the high-speed mobile radio transmission is stopped and the transmission to the distance in a steady state is required, there is a problem that the former transmission apparatus having inferior transmission characteristics to the distance must be used reluctantly as it is.

It is an object of the present invention to remove the above defects by providing a transmission system and a receiving apparatus of an OFDM scheme using the synchronous modulation method easy to handle and which can be easily used properly as a transmission apparatus suitable for the high-speed mobile radio transmission and a transmission apparatus suitable for transmission to the distance and can easily cope with sudden change of transmission conditions in a relay field.

A signal transmission system of an orthogonal frequency multiplexing using a plurality of carriers to transmit OFDM signal according to the present invention comprises a transmitting apparatus and a receiving apparatus. The receiving apparatus comprises an input unit for applying the OFDM signal from the transmitting apparatus; a fast Fourier transforming unit coupled with the input unit, for separating the OFDM signal into base-band signals including pilot signals of respective carriers; an interpolation unit coupled with the fast Fourier transforming unit, for interpolating the pilot signals in a time-axis direction and a frequency-axis direction to calculate reference signal vectors of said carriers in which the pilot signals are not included; a demodulation unit coupled with the interpolation unit, for decoding to be produced as information codes; a delay unit coupled with the Fourier transforming unit and the demodulation unit, for adjusting a delay time of said base-band signals passing therethrough; and a control unit coupled with the interpolation unit, for changing frequency band characteristics of the interpolation unit.

A receiving apparatus for a signal transmission system according to the present invention receives a transmission signal including information codes transmitted with an orthogonal frequency division multiplexing scheme wherein information codes are transmitted by using a plurality of carriers. The transmission signal has a carrier structure that there is a plurality of carrier rows each having a plurality of carriers in different frequencies arranged along a frequency axis, and a plurality of carrier rows are arranged along a time-axis. Each carrier row constitutes a symbol. Pilot signals are inserted in the carriers of a predetermined frequencies at intervals of a predetermined number of symbols in the direction of the time-axis, and while the pilot signals are inserted in the carriers at intervals of a predetermined number of carriers in the direction of the frequency-axis. The receiving apparatus produces reference signal vectors utilized as the basis for phase and amplitude in demodulation of the received signal on the basis of the pilot signals. The receiving apparatus comprises an interpolation circuit for interpolating the pilot signals extracted from the received signal in the time-axis direction and the frequency-axis direction to calculate reference signal vectors of carriers in which pilot signals are not arranged. The interpolation circuit includes a time-axis direction interpolation circuit for interpolating pilot signals extracted from carriers having the same frequency of a predetermined number of symbols adjacent to each other on the time axis to determine reference signal vectors of carriers in which the pilot signal is not inserted in the symbol having the same frequency. The receiving apparatus further comprise circuits for changing frequency band characteristics of the time-axis direction interpolation circuit.

A receiving apparatus for a signal transmission system according to the present invention receives a transmission signal including information codes transmitted with an orthogonal frequency division multiplexing scheme wherein information codes are transmitted by using a plurality of carriers. The transmission signal has a carrier structure that there is a plurality of carrier rows each having a plurality of carriers in different frequencies arranged along a frequency axis, and a plurality of carrier rows are arranged along a time-axis. Each carrier row constitutes a symbol. Pilot signals are inserted in the carriers of a predetermined frequencies continuously in the direction of the time-axis, and while the pilot signals are inserted in the carriers at intervals of a predetermined number of carriers in the direction of the frequency-axis. The receiving apparatus produces reference signal vectors utilized as the basis for phase and amplitude in demodulation of the received signal on the basis of the pilot signals. The receiving apparatus comprises a filter circuit for limiting a frequency band width of the pilot symbols extracted from the received signal and arranged in the time-axis direction and a frequency-axis direction interpolation circuit supplied with the pilot signals from the filter circuit and for interpolating the pilot signals extracted from a predetermined number of carries adjacent to each other on the frequency axis of each symbol to determine reference signal vectors of carriers in which the pilot signals are not inserted.

According to the present invention, when the transmission apparatus is used in the high-speed mobile radio transmission, the time-axis direction interpolation circuit is switched to use a filter having a characteristic of a wide pass bandwidth substantially equal to a Nyquist's frequency determined by an insertion frequency of carriers having the pilot signal in the time-axis direction.

With this operation, the transmission apparatus can be used as that having the resistant characteristic to the high-speed mobile radio transmission and immune to the multipath fading or the Doppler fading which is a characteristic feature of the OFDM system.

On the other hand, when the transmission apparatus is used fixedly after arrival of a destination or used while moving at a low speed, the time-axis direction interpolation circuit is switched to use a filter having a characteristic of a narrow pass bandwidth.

The time-axis direction interpolation circuit having the pass bandwidth of, for example, about 250 Hz is selected. In this case, the interpolation processing can be made only up to the Doppler frequency of one a few number-th of the pass bandwidth such as 250 Hz/8≅30 Hz and accordingly the moving speed of about 5 km/h is a usable limit.

However, since the pass bandwidth (250 Hz) of this time-axis direction interpolation circuit is narrower than that of the time-axis direction interpolation circuit having a wide pass bandwidth (2 kHz) used in the high-speed mobile radio transmission, noise can be reduced by about 10×log(2 kHz/ 250 Hz)=9 dB.

With this operation, the transmission apparatus can be used as that which can reduce a noise level mixed into the reference signal vector and transmit information codes having low error rate of code and good quality to the distance.

As described above, according to the present invention, the receiving apparatus suitable for characteristics according to applications can be attained by operation of a switching circuit for switching a band limitation characteristic to a different one in accordance with transmission conditions. Accordingly, there can be obtained the receiving apparatus of the OFDM scheme using the synchronous modulation method without uselessness that various transmission apparatuses suitable for various applications must be provided and capable of coping with sudden change of conditions (transmission form) in the field easily to attain easy handling.

DESCRIPTION OF THE EMBODIMENTS

A transmission system of an orthogonal frequency division multiplexing scheme according to the present invention is now described in detail with reference to embodiments shown in the accompanying drawings.

Figure 1:
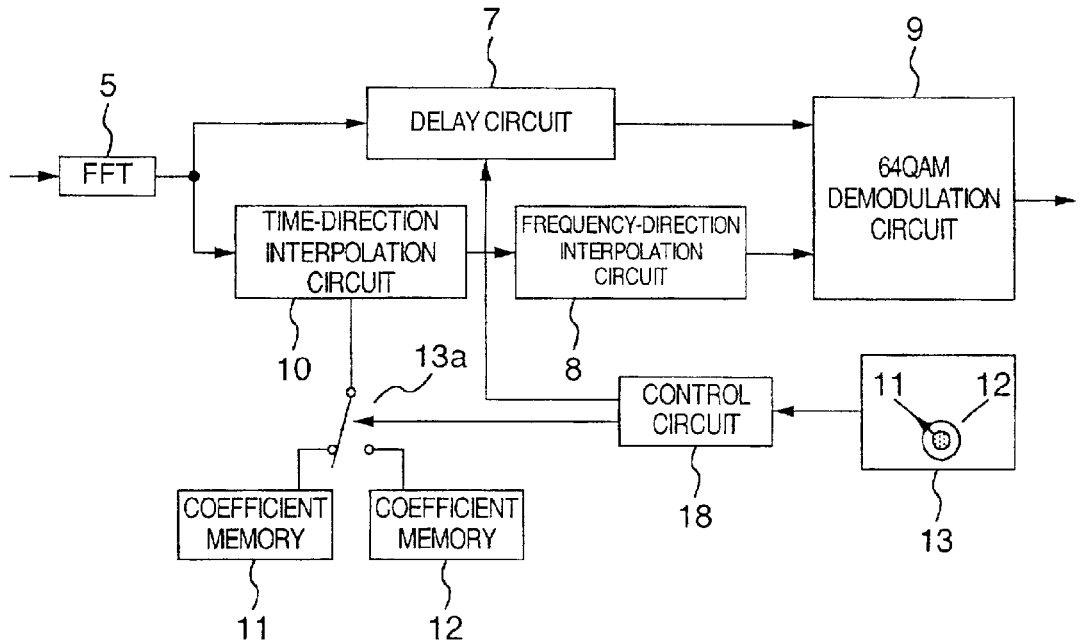
FIG. 1 is a block diagram schematically illustrating a first embodiment of a reference signal vector reproduction unit according to the present invention.
Figure 11:
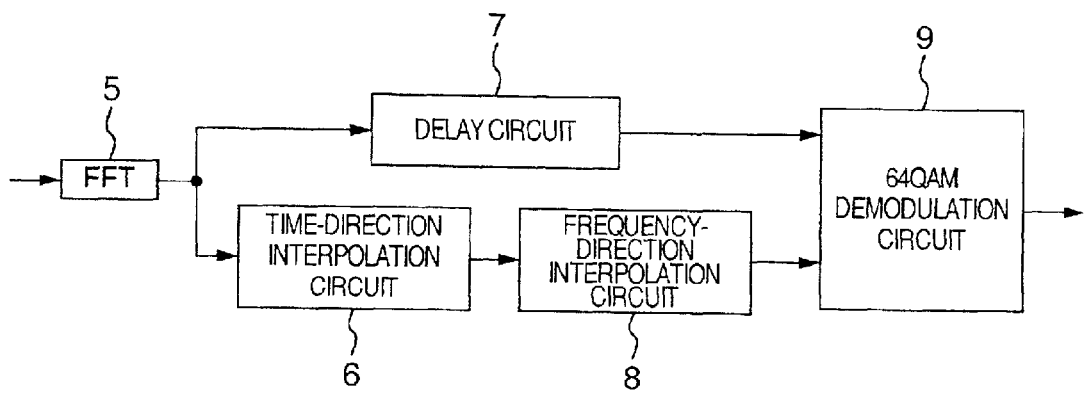
FIG. 11 is a block diagram schematically illustrating a reference signal vector reproduction unit of a conventional receiving apparatus.

FIG. 1 is a schematic diagram illustrating a first embodiment according to the present invention and particularly FIG. 1 illustrates a circuit portion for reproducing a reference signal vector of a receiving apparatus of the OFDM scheme. The first point thereof different from the conventional circuit of FIG. 11 is that coefficient memories for storing coefficient values of an LPF used in a time-direction interpolation circuit 10 is disposed outside of the interpolation circuit 10. The second point different from the conventional circuit is that two or more coefficient memories are provided and switched by a switch 13a controlled by a control circuit 18 by means of an operation unit 13 so that an optimum coefficient value can be used in accordance with transmission conditions. The third point different from the conventional circuit is that a delay time of a delay circuit 7 is also switched simultaneously when the plurality of coefficient memories are switched.

The blocks of the circuit of FIG. 1 designated by the same reference numerals as those of FIG. 11 are basically the same functional elements or circuits as FIG. 11. Description of the embodiment of the present invention is mainly made to portions different from FIG. 11.

Figure 3:
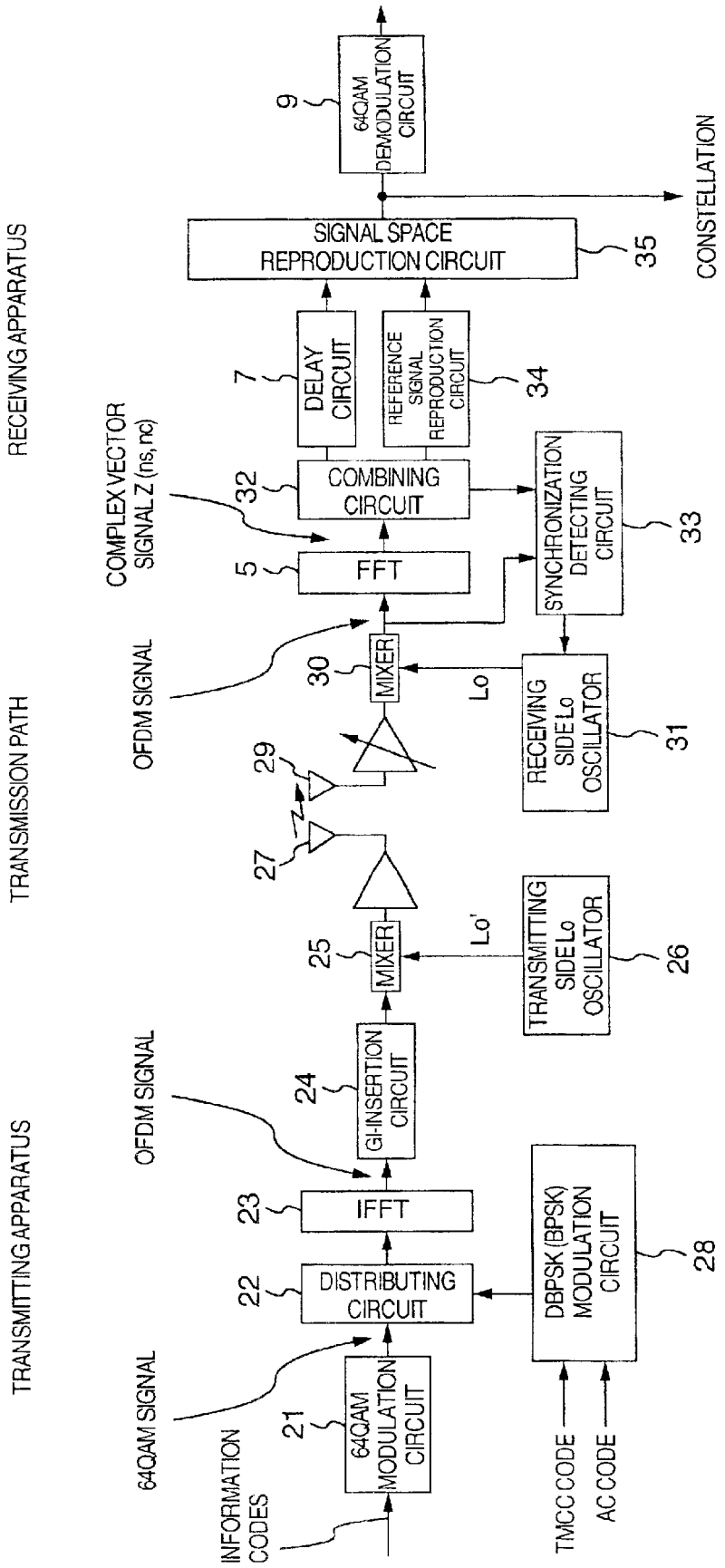
FIG. 3 is a block diagram schematically illustrating a signal transmitting and receiving system of an OFDM scheme to which the present invention is applied.
Figure 9:
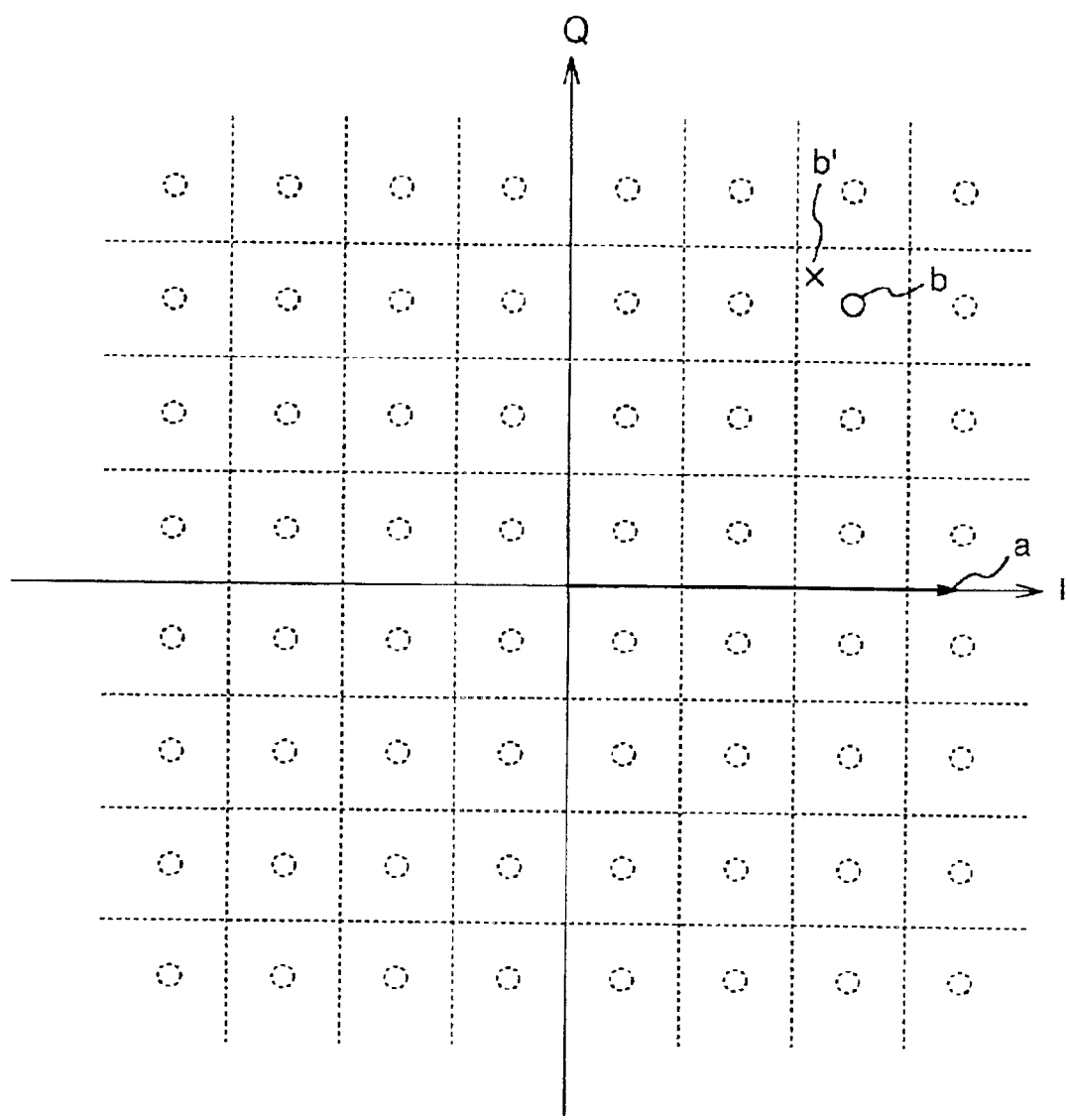
FIG. 9 is a diagram explaining an arrangement of signal points in the 64QAM system.

First of all, referring to the block diagram of FIG. 3, operation of a signal transmitting and receiving system of the OFDM scheme to which the present invention is applied is described by way of example. In a transmitting apparatus, a 64QAM modulation circuit 21 modulates error-correction coded information codes to complex vector signals of the 64QAM scheme. In this modulation processing, a sequence of input information codes is divided in units of 6 bits and each of the 6-bit code is assigned to one of 64 signal points on the I-Q complex plane as shown in FIG. 9 so that the 6-bit code is converted into a 64QAM modulation signal (complex vector signal) corresponding to the coordinate value of the assigned signal point on the I-Q complex plane.

Figure 4:
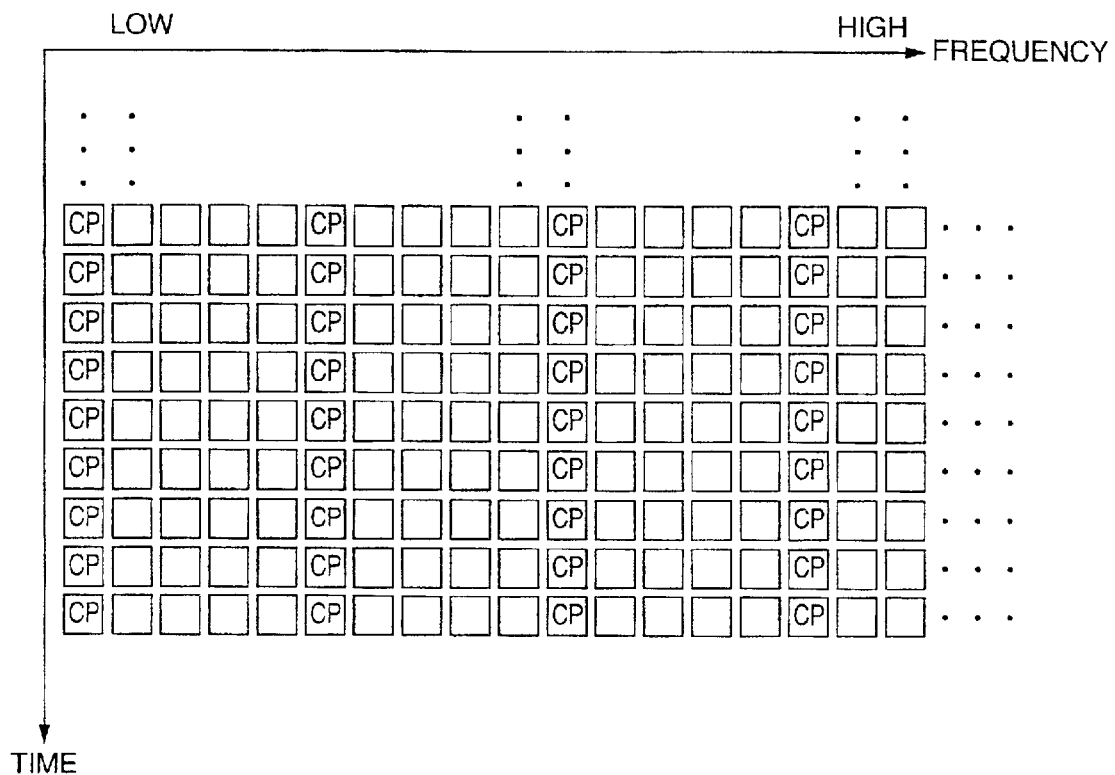
FIG. 4 is a schematic diagram showing a carrier structure of a second embodiment according to the present invention.
Figure 8:
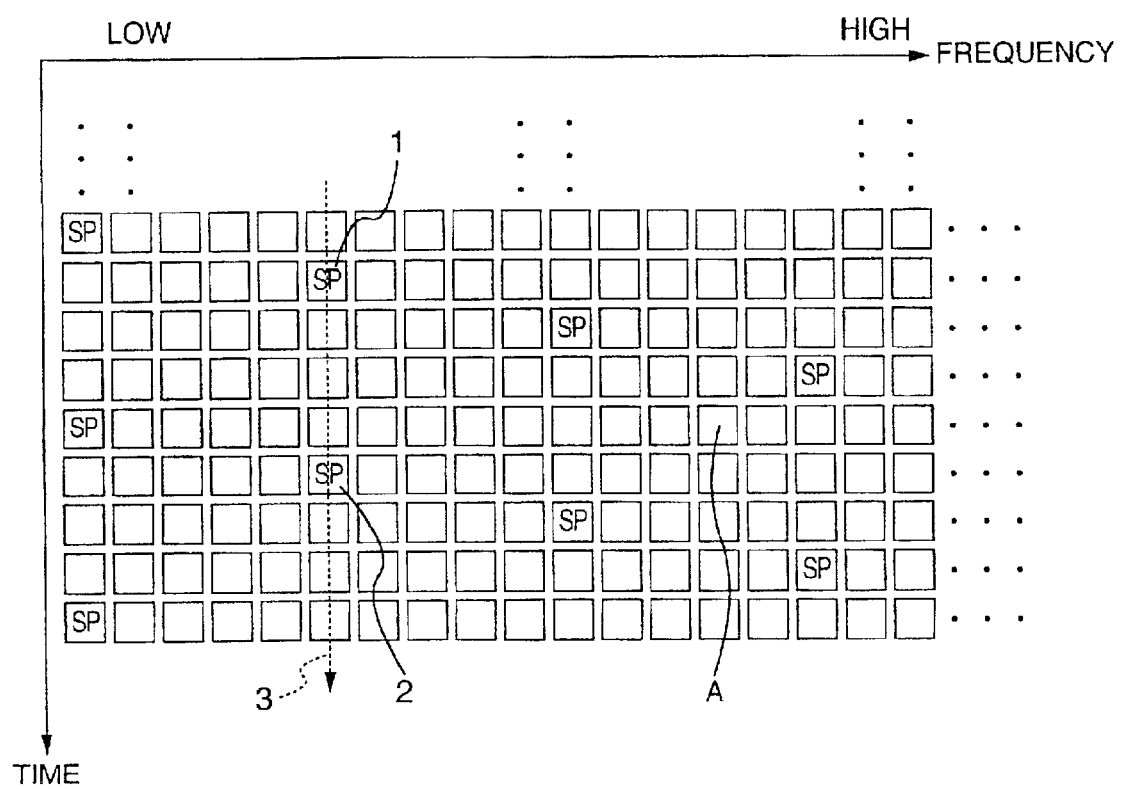
FIG. 8 is a diagram explaining an example of a carrier structure in the terrestrial-wave digital broadcasting system.

The 64QAM modulation signals are assigned to a plurality of different carriers in a distributing circuit 22. Further, another modulation circuit 28 modulates a pilot signal (SP) and a TMCC signal or an AC signal which is an auxiliary signal in accordance with the BPSK or DBPS scheme and the modulated auxiliary signal (complex vector signal) is supplied to the distributing circuit 22. The distributing circuit 22 assigns the 64QAM modulation signal of a main information signal, the pilot signal (SP) from the modulation circuit 28 and the signal modulated by the auxiliary signal such as the TMCC or AC signal to each carrier in accordance with a distributing table stored in a memory (not shown) included in the distributing circuit 22 to attain a carrier arrangement as shown in FIG. 8 or 4. Data indicating which signal is assigned to which carrier is written in the distributing table.

The plurality of carriers modulated by the distributing circuit 22 is subjected to the inverse discrete fast Fourier transform (IFFT) in an IFFT (Inverse fast Fourier Transform) circuit 23. In this transform, the 64QAM signal is converted into an OFDM signal of the baseband multiplexed in accordance with the OFDM scheme and including about 1,400 carriers having a time interval Ts' defining a symbol period and separated by a frequency interval fs from one another and the carriers are orthogonal to one another. Thereafter, a guard interval is added to the OFDM signal in a guard interval insertion circuit 24. The guard interval is provided for improving the robustness of the receiver against the multi-path fading. Further detail explanation for the guard interval is omitted since it does not directly relate to the object of the present invention.

The OFDM signal having the guard interval added thereto is further supplied to a mixer 25 in which the OFDM signal is multiplied by a transmitting side local high-frequency signal Lo' produced by a transmitting side Lo oscillator 26 to be frequency-converted into a high-frequency band signal and this signal is then amplified in power to be transmitted from a transmitting antenna 27.

On the other hand, in a receiving apparatus, the signal received by a receiving antenna 29 is amplified and supplied to a mixer 30, in which the received signal is multiplied by a receiving side local signal Lo produced by a receiving side Lo oscillator 31 to be frequency-converted, so that the multiplexed OFDM signal of the baseband is reproduced. Further, the OFDM signal is subjected to the discrete fast Fourier transform (FFT) in an FFT (Fast Fourier Transform) circuit 5 and separated into complex vector signals Z (ns, nc) of the baseband of each carrier. "ns" represents a symbol number of the received signal and "nc" represents a carrier number of the separated carrier.

The separated complex vector signals Z (ns, nc) of each carrier are separated into the 64QAM signal, the pilot signal, the TMCC or AC signal and the like in a combining circuit 32 in the procedure reverse to that in the mapping circuit 22. The pilot signal of them is supplied to a reference signal reproduction circuit 34 to reproduce the reference signal vector. The reproduced reference signal vector is supplied to a signal space reproduction circuit 35 together with all signals delayed by a reference signal reproduction calculation time to reproduce a signal space coordinate of FIG. 9. The signals at the signal points on the reproduced signal space coordinates are supplied to a 64QAM demodulation circuit 9 in which the 64QAM signals are demodulated and a convolution signal are decoded to be produced as the information codes.

Figure 2:
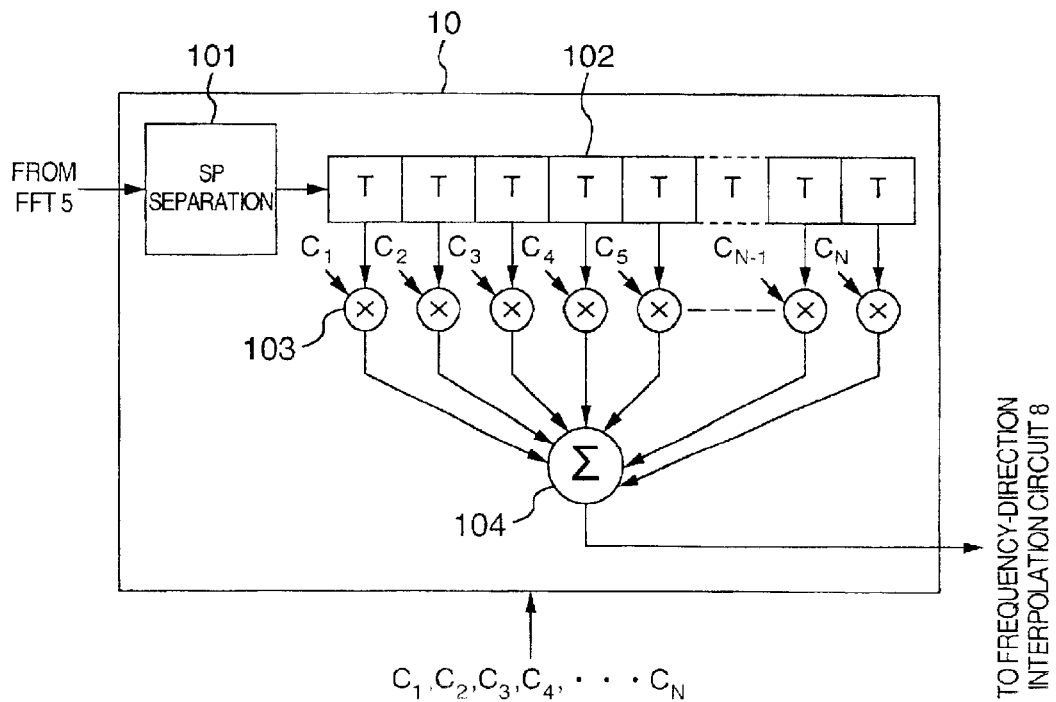
FIG. 2 is a schematic diagram illustrating a time-axis direction interpolation circuit of FIG. 1.
Figure 13:
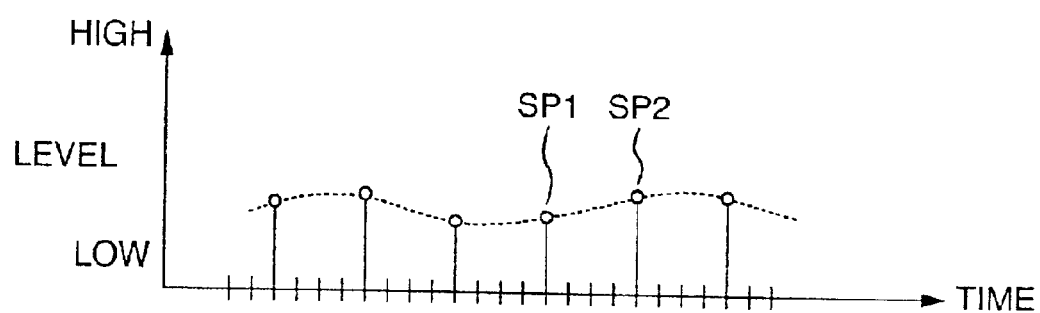
FIG. 13 is a diagram explaining interpolation of carriers in a time-axis direction.
Figure 14:
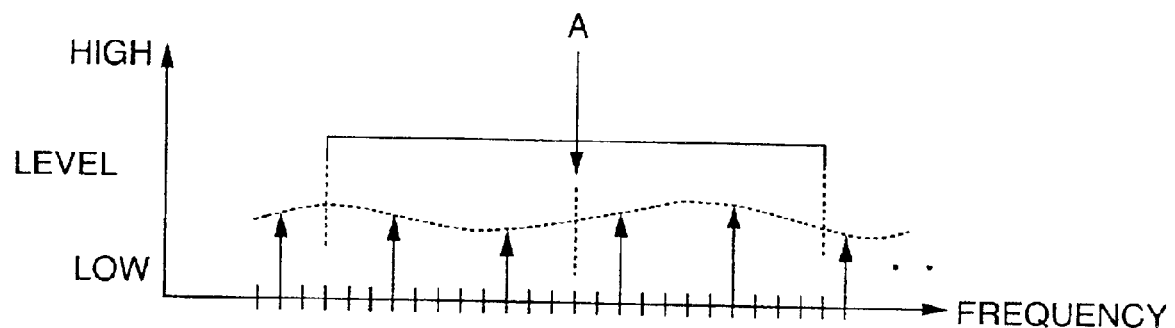
FIG. 14 is a diagram explaining interpolation of carriers in a frequency direction.

FIG. 2 schematically illustrates a definite circuit of a time-axis direction interpolation circuit 10 of FIG. 1. The time-axis direction interpolation circuit 10 corresponds to the reference signal reproduction circuit 34 of FIG. 3. An SP separation unit 101 extracts only SP signals of carrier having the same frequency from the received signal from the FFT 5. The extracted SP signals are sequentially inputted to a shift register 102 of a transversal type LPF having a predetermined number of taps. T represents delay elements. Outputs produced from the taps of the shift registers 102 are multiplied by tap coefficients C1, C2, C3, . . . , CN in a multiplier 103. All outputs of the multiplier 103 are added by an adder 104. The output of the adder 104 shows an interpolation result of the SP signals as shown in FIG. 13. In other words, the pilot signals extracted from the carriers having the same frequency of a predetermined number of symbols adjacent on the time axis are interpolated to obtain the reference signal vector of the carriers in which the pilot signal is not inserted in the symbol having the same frequency. The SP interpolation processing in the time-axis direction is performed to each of carrier rows in which the SP signals are arranged in FIG. 8 and the reference signal vector obtained by the interpolation is outputted to be supplied to a frequency-direction interpolation circuit 8. In the SP signal arrangement of FIG. 8, each symbol is composed of 1,400 carriers and a row of the carrier frequency in which the SP signals are arranged has 1400/5=280 carriers. Accordingly, in the embodiment, the SP interpolation processing in the time-axis direction is performed to each of 280 carrier frequencies.

Stored in a first coefficient memory 11 of FIG. 1 is a coefficient value that the LPF used in the time-direction interpolation circuit 10 has the characteristic suitable for a high-speed mobile radio transmission and has the characteristic of a wide pass bandwidth of the LPF having a Nyquist's frequency of 2 kHz, for example.

On the other hand, stored in a second coefficient memory 12 is a coefficient value that the LPF has the characteristic of a narrow pass bandwidth of the LPF in which a noise reduction effect is attained although interpolation processing can be made to only up to the Doppler frequency of 30 Hz, for example. Such LPF is appropriate to use for a receiving apparatus used in a fixed condition or in low moving speed, and also for transmitting a signal in long distance.

Accordingly, when the operator selects the first coefficient memory 11 by means of the operation unit 13, the LPF is provided with a broad pass band, and the transmission apparatus can attain the characteristic appropriate to the high-speed mobile radio transmission. On the other hand, when the second coefficient memory 12 is selected by means of the operation unit 13, the transmission apparatus can transmit information codes of good quality to the distance although the characteristic appropriate to the high-speed mobile radio transmission is degraded.

In other words, the transmission apparatus can easily change its characteristic in accordance with an application by a single switching operation by means of the operation unit 13.

On the other hand, as described above, even if a cut-off frequency of the pass bandwidth of LPF is set to 2 kHz, an actually usable frequency is about 250 Hz corresponding to about one eighth thereof. In order to narrow the band while holding the ratio of about one eighth, a filter having a larger number of taps is required usually. Additionally, for the time-direction interpolation circuit for performing interpolation in the time direction, the increased taps increases a delay time T for a symbol unit as they are. In the case of the radio transmission apparatus, it is necessary to make the delay time as short as possible, while when the delay time of the delay circuit 7 is set in accordance with the tap number of the time-direction interpolation circuit, a useless delay time occurs if the time-direction interpolation circuit for the wide band in which the tap number may be small is selected.

A control circuit 18 is provided to avoid this uselessness. That is, when the coefficient memory is switched by means of a switching operation of the operation unit 13, the control circuit 18 controls the delay circuit 7 simultaneously so that the received signal is delayed by a delay time corresponding to the tap number for each coefficient.

With such control, the uselessness of the delay time is eliminated and there can be configured the transmission apparatus having the satisfactory efficiency according to the desired characteristics.

In the embodiment, in order to prevent increase of a circuit scale, the coefficient values used are changed by way of example instead of provision of two time-direction interpolation circuits to be switched and having different characteristics. However, it is apparent that two time-direction interpolation circuits having different pass bandwidth characteristics may be provided to be switched by means of a switch.

As described above, according to the embodiment, there can be provided the transmission apparatus of the OFDM scheme using the synchronous modulation method in which the uselessness that dedicated transmission apparatuses are used in accordance with applications is eliminated and which can easily cope with sudden change of transmission conditions in the field and attain easy handling. Further, the above effects can be attained without missing the characteristic appropriate to the high-speed mobile radio transmission.

A second embodiment of the present invention is now described.

Figure 10:
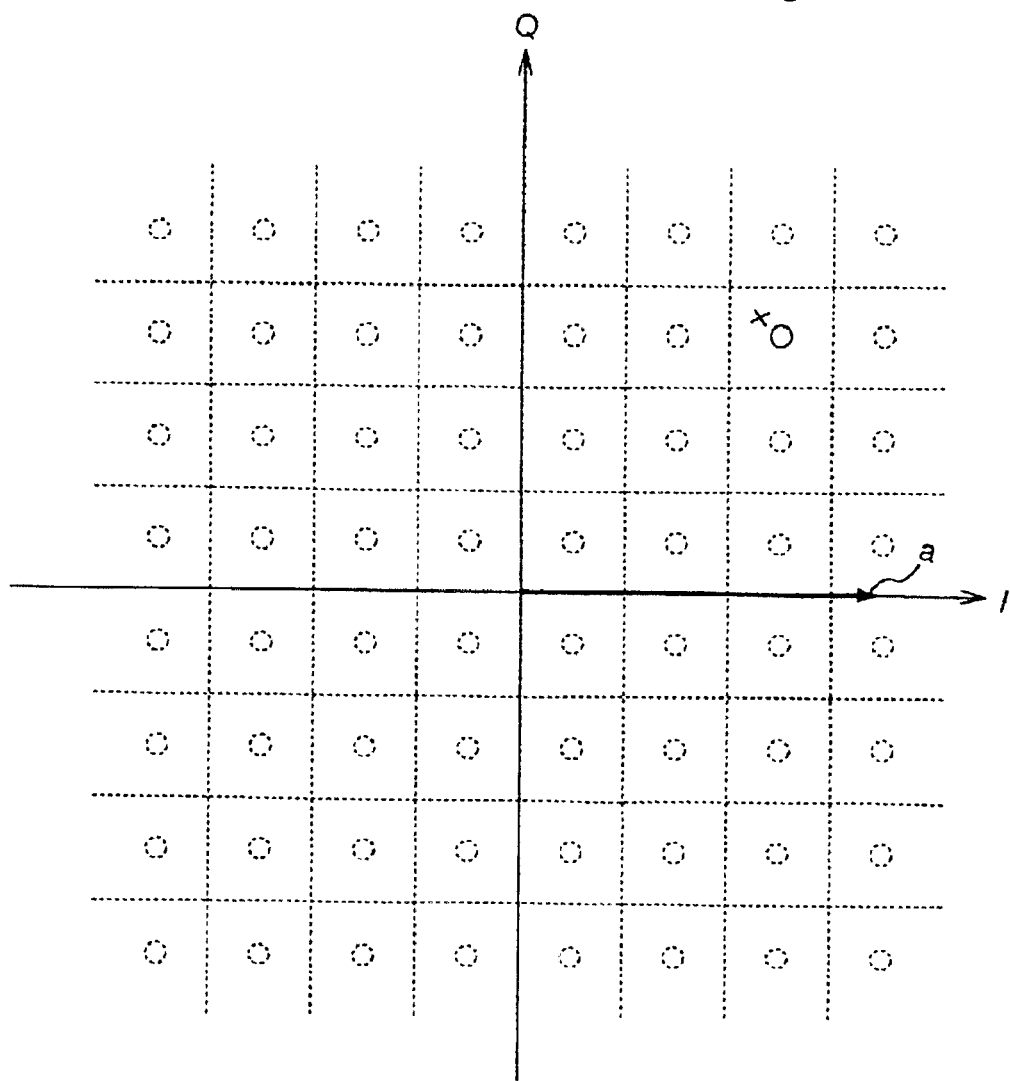
FIG. 10 is a diagram explaining positions of signal points and change of phase of a received signal on a reception side.

The second embodiment is different from the first embodiment in that the second embodiment uses a carrier structure in which pilot signals (CP) are inserted continuously in the time direction as shown in FIG. 4, whereas in the first embodiment it is premised that the pilot signals SP are inserted at regular intervals in the time direction as shown in FIG. 10. In FIG. 4, the mark indicating the positions where the pilot signals are inserted is changed to CP (Continual Pilot) for emphasizing continuous insertion in order to clear the difference from the carrier structure of FIG. 8 where the pilot signals are inserted sporadically.

In the case of the carrier structure shown in FIG. 4, the pilot signals CP are continuously inserted into carriers having a certain frequency in the time direction.

Accordingly, in the interpolation in the frequency direction, the pilot signals CP can be used as they are and it is not necessary to reproduce the reference signal vector by means of the interpolation in the time direction.

Figure 5:
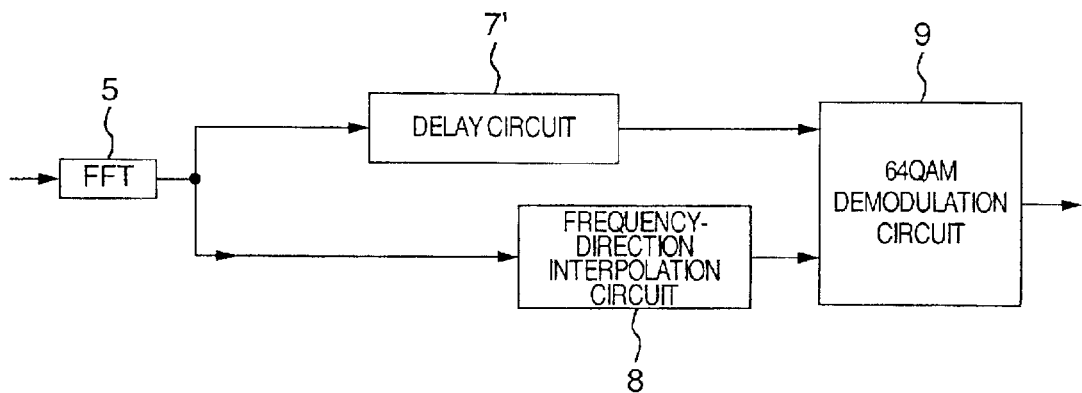
FIG. 5 is a block diagram illustrating a basic configuration of the second embodiment of a reference signal vector reproduction unit according to the present invention.

In other words, with the carrier structure of FIG. 4, the reference signal vector can be reproduced basically by the circuit configuration requiring no time-direction interpolation circuit, as shown in FIG. 5.

In order to improve the characteristic appropriate to the high-speed mobile radio transmission, it is necessary to correctly interpolate and reproduce a high frequency component produced by the Doppler phenomenon and contained in the pilot signal. The limit of frequency of the correctly reproducible high-frequency component determines the lower limit of the characteristic for the purpose of the high-speed mobile radio transmission of the transmission apparatus used in the embodiment.

Figure 12:
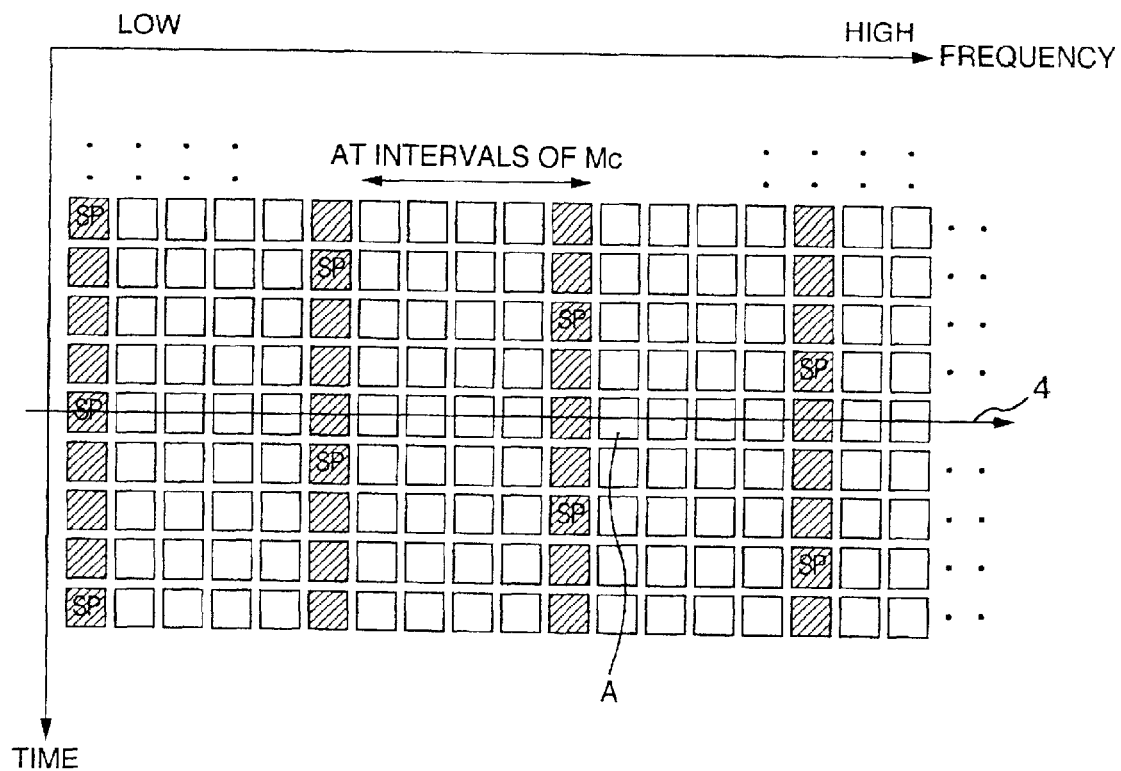
FIG. 12 is a schematic diagram illustrating an example of a carrier arrangement in the terrestrial-wave digital broadcasting system.

As shown in FIG. 12, when the pilot signals are inserted intermittently, the interpolation in the time direction is indispensable, while there is a drawback that the interpolation in the time direction reduces or eliminate the level of the high-frequency component produced by the Doppler phenomenon.

On the contrary, although repeated, in the carrier structure of FIG. 4, it is not necessary to use the time-direction interpolation circuit basically. Accordingly, the pilot signals CP containing the high-frequency component produced by the Doppler phenomenon can be used as they are to reproduce the reference signal vector and obtain the highest resistant characteristic to the high-speed mobile radio transmission.

However, this carrier structure has a problem that noise mixed into the pilot signals CP is mixed into the reproduced reference signal vector as it is, so that the error rate of the demodulated information codes is increased.

Figure 6:
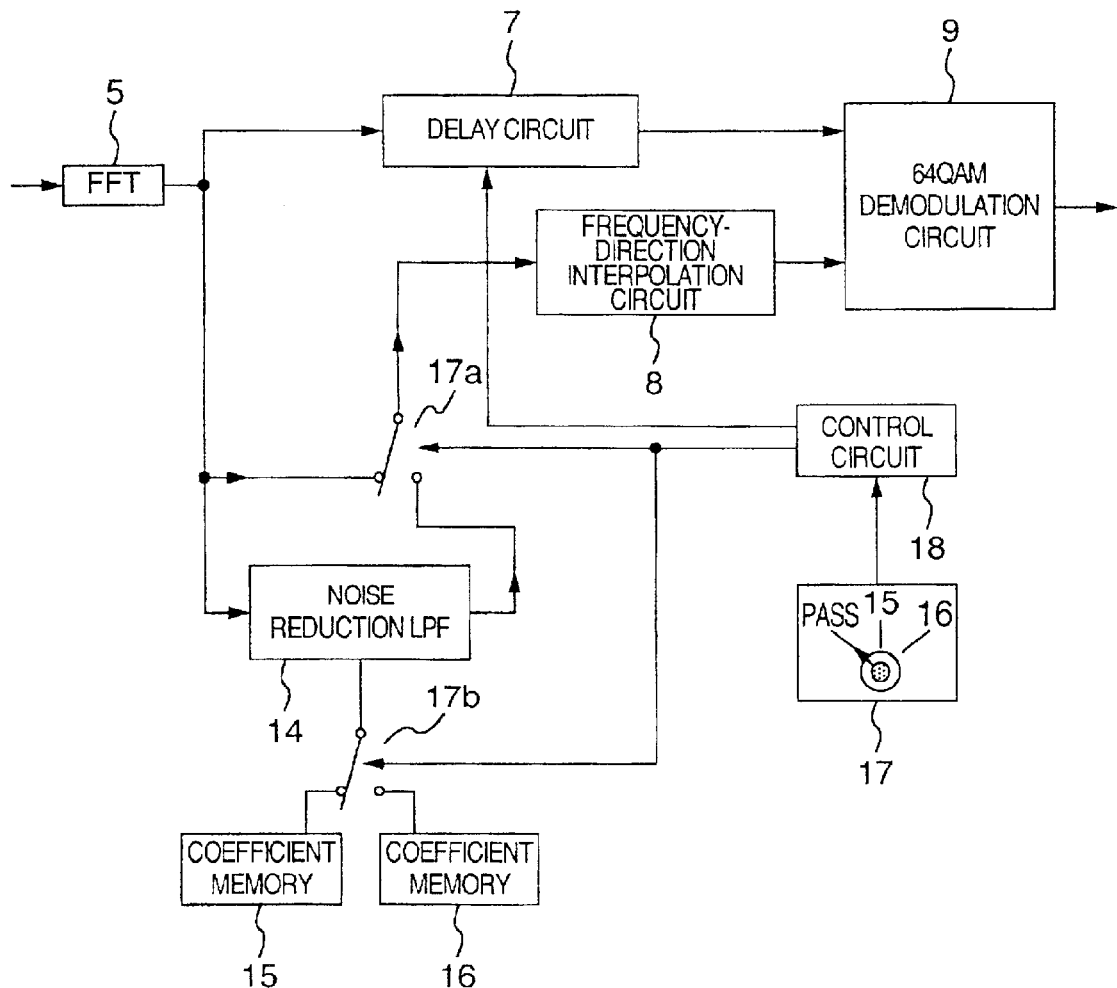
FIG. 6 is a block diagram schematically illustrating the second embodiment of a reference signal vector reproduction unit according to the present invention.
Figure 7:
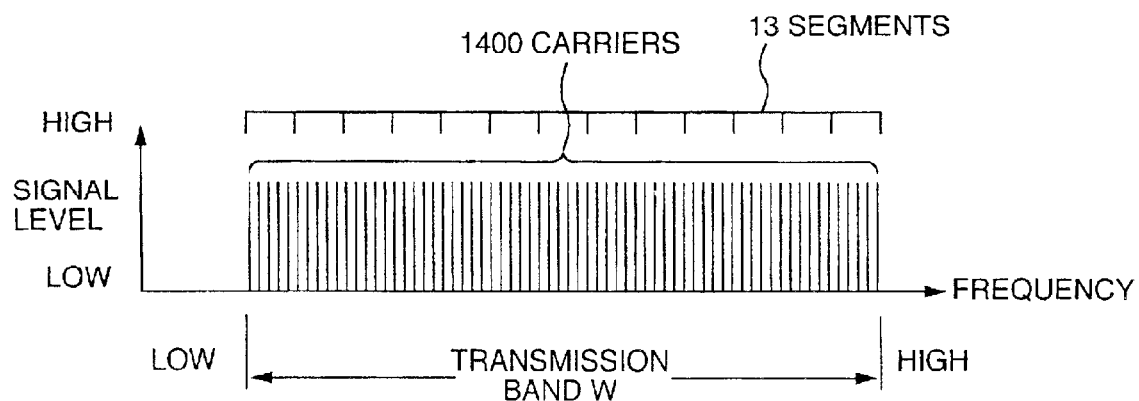
FIG. 7 is a diagram explaining an example of a carrier structure in a terrestrial-wave digital broadcasting system.

In order to solve the problem, in the second embodiment, as shown in FIG. 6, a noise reduction LPF 14 is added to the basic circuit of FIG. 5 for reproducing the reference signal vector. The structure of the noise reduction LPF 14 is the same as that of the time-axis direction interpolation circuit 10 of FIG. 2 basically. However, the LPF 14 is supplied with the CP signals instead of the SP signals. The CP signals are inputted to the LPF 14 for each carrier frequency arranged continuously in the time-axis direction of the arrangement of FIG. 4.

The Operator can control to turn on and off a switch 17a by the control circuit 18 by means of the operation unit 17, so that the received pilot signals CP are supplied to the frequency-direction interpolation circuit 8 through the noise reduction LPF 14 or directly without passing through the noise reduction LPF 14.

Further, the noise reduction LPF 14 is connected to a first coefficient memory 15 for storing a coefficient value that the noise reduction LPF 14 has the characteristic of a narrow bandwidth similarly to the coefficient memory 12 of the first embodiment and suitable for the transmission to the distance and a second coefficient memory 16 for storing a coefficient value that the noise reduction LPF 14 has the characteristic of a slightly wide bandwidth similarly to the coefficient memory 11 of the first embodiment and suitable for the mobile radio transmission at a relatively high speed. The coefficient memories can be switched by means of the switches 17a and 17b of the operation unit 17.

With the transmission apparatus having such a circuit configuration, the received CP signals can be directly inputted to the frequency-direction interpolation circuit 8 by means of the switch 17a, so that there can be realized the transmission apparatus having a good characteristic appropriate to the mobile radio transmission at a higher speed as compared with the transmission apparatus having the carrier structure shown in FIG. 12.

Further, the switches 17a and 17b are operated by means of the operation unit 17 so that the CP signals pass through the path connected to the frequency-direction interpolation circuit 8 through the noise reduction LPF 14 using the coefficient value stored in the first coefficient memory 15 to thereby degrade the characteristic appropriate to the mobile radio transmission, while there can be realized the transmission apparatus capable of transmitting the information codes of good quality to the distance with reduced error rate of code.

Moreover, the switches 17a and 17b are operated by means of the operation unit 17 so that the CP signals pass through the path connected to the frequency-direction interpolation circuit 8 through the noise reduction LPF 14 using the coefficient value stored in the second coefficient memory 16 to thereby maintain the better characteristic appropriate to the mobile radio transmission to the same extent as the conventional receiving apparatus having the carrier structure shown in FIG. 12 and there can be realized the receiving apparatus capable of reproducing the information codes of good quality to the distance with reduced error rate of code as compared with the conventional receiving apparatus.

Thus, there can be realized the receiving apparatus having the higher characteristic appropriate to the high-speed mobile radio receiving than the conventional receiving apparatus or capable of attaining reception in the distance with lower error rate of code than the conventional receiving apparatus and which can use properly the characteristics suitable for various applications by a single switch operation of the operation unit to attain easy handling.

Accordingly, there can be obtained the receiving apparatus of the OFDM scheme accomodated to the synchronous modulation method without uselessness that various transmission apparatuses suitable for various applications must be provided and capable of coping with sudden change of conditions (transmission form) in the field easily to attain easy handling.

The control circuit 18 for controlling the delay time of the delay circuit 7 is provided to avoid occurrence of the useless delay time similarly to the first embodiment and its operation is the same as the first embodiment. Thus, description thereof is omitted.

Further, in the second embodiment, when the LPF having even taps is used as the noise reduction LPF 14, a phase shift by a half symbol time occurs in the reference signal vector produced from the LPF. This phase shift does not cause any problem for the usual LPF for merely reducing noise. However, in the case of the noise reduction LPF used in the second embodiment for reducing noise of the reference signal vector, the phase shift appears as a phase distortion of the reference signal as it is and it becomes a fatal defect.

Accordingly, in the second embodiment, it is indispensable to use the LPF having odd taps which does not cause a phase shift as the noise reduction LPF 14.

Further, in the second embodiment, instead of the provision of the path that the received CP signals are directly supplied to the frequency-direction interpolation circuit 8, it is apparent that the CP signals may be supplied to the noise reduction LPF 14 using the coefficient value having the same characteristics as the case where the CP signals are directly supplied to the frequency-direction interpolation circuit 8, such as, for example, a filter having one tap and the coefficient value equal to 1.

In the embodiments, two kinds of filter characteristics are provided for the time-axis direction interpolation circuit 10 and the noise reduction LPF 14 and two sets of tap coefficient values are provided, the present invention is not limited thereto. Three or more kinds of tap coefficients having different characteristics may be provided in a memory and a tap coefficient having optimum characteristics under utilization conditions of the receiving apparatus may be selected therefrom by means of a switch. Moreover, different frequency characteristics may be changed continuously. Further, two coefficient memories are shown in the circuits of FIGS. 1 and 6, while two memory areas for storing two kinds of tap coefficient values may be provided in one memory actually.

As described above, according to the present invention, there can be provided the receiving apparatus of the OFDM scheme accomodated to the synchronous modulation method in which the uselessness that various receiving apparatuses suitable for various applications must be provided is eliminated and which can easily cope with sudden change of conditions (transmission conditions) in the field and attain easy handling.

What is claimed is:

1. A signal transmission system of an orthogonal frequency division multiplexing using a plurality of carriers to transmit OFDM signal comprising a transmitting apparatus and a receiving apparatus, said receiving apparatus comprising;
    an input unit for applying said OFDM signal from said transmitting apparatus:
    a fast Fourier transforming unit coupled with said input unit, for separating said OFDM signal into base-band signals including pilot signals of respective carriers;
    an interpolation unit coupled with said fast Fourier transforming unit, for interpolating said pilot signals in a time-axis direction and a frequency-axis direction to calculate reference signal vectors of said carriers in which said pilot signals are not inserted;
    a demodulation unit coupled with said interpolation unit, for decoding to be produced as information codes:
    a delay unit coupled with said a Fourier transforming unit and said demodulation unit, for adjusting a delay time of said base-band signals passing therethrough; and
    a control unit coupled with said interpolation unit, for changing frequency band characteristics of said interpolation unit.

2. A signal transmission system according to claim 1, wherein said interpolation unit comprises a time-direction interpolation circuit and a frequency-direction interpolation circuit, and said control unit controls frequency band characteristics of said time-direction interpolation circuit on the basis of transmission condition of said OFDM signal.

3. A signal transmission system according to claim 2, wherein said control unit includes at least two memories, each of which is stored different coefficient values.

4. A signal transmission system according to claim 3, wherein one of said memories is stored with coefficient values relating to the characteristic suitable for a high-speed mobile radio transmission and the other of said memories is stored with coefficient values relating to the characteristic suitable for a fixed condition or a low moving condition of said receiving apparatus.

5. A signal transmission system according to claim 2, wherein said time-direction interpolation circuit comprising a circuit for separating said pilot signal and a transversal type low pass filter.

6. A signal transmission system according to claim 2, wherein said control unit controls the delay time of said delay unit when the frequency band characteristics of said time-direction interpolation circuit are changed.

7. A receiving apparatus for a signal transmission system of an orthogonal frequency division multiplexing type using a plurality of carriers orthogonal to one another to transmit information codes, said receiving apparatus receiving, signals wherein pilot signals are inserted in the carriers of a predetermined frequencies at intervals of a predetermined number of symbols in the direction of the time-axis and in the carriers at intervals of a predetermined number of carriers in the direction of the frequency-axis, and reference signal vectors utilized as the basis for demodulation being produced from the pilot signals extracted from the received signal, said receiving apparatus comprising:
    an interpolation circuit for interpolating said pilot signals extracted from said received signal in said time-axis direction and said frequency-axis direction to calculate reference signal vectors of carriers in which pilot signals are not inserted;
    said interpolation circuit including a time-axis direction interpolation circuit for interpolating the extracted pilot signals to produce the reference signal vectors of carriers in which said pilot signal is not inserted in the symbol having the same frequency,
    said receiving apparatus further comprising circuits for changing frequency band characteristics of said time-axis direction interpolation circuit.

8. A receiving apparatus according to claim 7, wherein said time-axis interpolation circuit includes a circuit for separating said pilot signals from said received signal and a low pass filter of a transversal type supplied with a predetermined number of separated pilot signals to interpolate them, and said circuits, for changing frequency band characteristics change tap coefficient values of said low pass filter of the transversal type.

9. A receiving apparatus according to claim 8, comprising a delay circuit for delaying said received signal and a circuit for controlling a delay time of said delay circuit so as to adjust a timing of the signal delayed by said delay circuit and the pilot signals obtained by said interpolation circuit when the frequency band characteristics of said interpolation circuit are changed.

10. A receiving circuit according to claim 8, wherein said circuit for changing said frequency band characteristics includes memories for storing a set of different tap coefficient values for giving the frequency band characteristics different from each other to said low pass filter.

11. A receiving apparatus for a signal transmission system of an orthogonal frequency division multiplexing type in which a plurality of carriers orthogonal to one another to transmit information codes, said receiving apparatus receiving signals wherein pilot signals are inserted in each symbol of said plurality of carriers continuously in the direction of the time-axis and at intervals of a predetermined number of carriers in the direction of the frequency-axis, and reference signal vectors utilized as the basis for demodulation being produced from the pilot signals extracted from the received signal, said receiving apparatus comprising:
- a filter circuit for limiting a frequency band width of said pilot symbols extracted from said received signal and arranged in said time-axis direction; and
- a frequency-axis direction interpolation circuit for interpolating said pilot signals from said filter circuit in the direction of said frequency axis of each symbol to produce reference signal vectors of carriers in which said pilot signals are not inserted.

12. A receiving apparatus according claim 11, further comprising circuits for changing frequency band characteristics of said filter circuit.

13. A receiving apparatus according to claim 12, further comprising a circuit for supplying said pilot signals extracted from said received signal to said frequency-axis direction interpolation circuit while bypassing said filter circuit.

14. A receiving apparatus according to claim 12, wherein said filter circuit includes a low pass filter of a transversal type and said circuits for changing said frequency band characteristics change tap coefficient values of said low pass filter of the transversal type.

15. A receiving apparatus according to claim 12, further comprising a delay circuit for delaying said received signal and a circuit for controlling a delay time of said delay circuit so as to adjust a timing of the signal delayed by said delay circuit and the pilot signals obtained by said interpolation circuit.

16. A receiving apparatus according to claim 14, wherein said circuits for changing said frequency band characteristics include memories for storing a set of different coefficient values for giving the frequency characteristics different from each other to said low pass filter.

* * * * *